United States Patent [19]

Hall

[11] Patent Number: 5,294,936
[45] Date of Patent: Mar. 15, 1994

[54] RADAR SECTOR BLANKER

[75] Inventor: Roger B. Hall, Falmouth, Va.

[73] Assignee: The United States of America as represented by the Secretary of the Navy, Washington, D.C.

[21] Appl. No.: 74,100

[22] Filed: Jun. 7, 1993

[51] Int. Cl.$^5$ ............................................. G01S 13/00
[52] U.S. Cl. ............................................. 342/175
[58] Field of Search ................. 342/82, 165, 175, 198

[56] References Cited

U.S. PATENT DOCUMENTS

| | | | |
|---|---|---|---|
| 2,535,266 | 12/1950 | Chance | 342/82 |
| 2,959,737 | 11/1960 | Simopoulos | 328/110 |
| 3,039,090 | 6/1962 | Donovan | 343/5 |
| 3,050,726 | 8/1962 | Laurent | 343/17.1 |
| 3,278,936 | 10/1966 | Wolf | 343/18 |
| 3,394,372 | 7/1968 | Schrader | 342/82 |
| 4,584,578 | 4/1986 | Brauns et al. | 342/175 |
| 4,660,042 | 4/1987 | Ekstrom | 342/175 |
| 4,868,574 | 9/1989 | Raab | 342/81 |

Primary Examiner—Mark Hellner
Attorney, Agent, or Firm—John D. Lewis; Jacob Shuster

[57] ABSTRACT

A radar sector blanker comprises an analog-to-digital converter and a sector controller unit. The analog-to-digital converter receives the analog synchro voltages describing the positioning of a radar antenna and changes these voltages into binary-coded decimal (BCD) information. The sector controller unit comprises a portable housing, a controller system, and a power supply. The controller system includes an OFF comparator circuit, an ON comparator circuit, an S-R latch, and a solid-state switch. Each comparator circuit comprises three cascaded transistor-transistor logic (TTL) integrated chips. The power supply gives a direct-current voltage to the solid-state switch and the TTL chips. The sector blanker blocks transmission for a pre-determined rotational region or sector of a radar system.

9 Claims, 2 Drawing Sheets

RADAR SECTOR BLANKER

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to search radar.

BACKGROUND OF THE INVENTION

A radar system operates by transmitting a high-intensity radio wave in a given direction. If the radio wave encounters a reflective object, part of the radio wave energy will echo or return to the antenna source and be detected by a receiver. By measuring the time to return, direction, and other signal characteristics of the echo, the radar system indicates the presence, distance, direction, velocity and other identifying features of the reflecting object.

Naval vessels typically maintain radar surveillance of nearby ships and aircraft during off-shore duty. The radar system provides information for navigation, station keeping of the convoy or battle group, control and recovery of aircraft, defensive and offensive surveillance, and direction and operation of on-board weapons systems. Because the radar systems are integrated to nearly every phase of the shipboard operations, a high level of maintenance is required to insure a high level of reliability. Routine maintenance includes periodic testing performed while the vessel is at sea and in port.

In-port testing of radar systems typically creates one notable difficulty. This difficulty involves the signal of the transmitting antenna. The high frequency, high power signal can interfere with other electronic equipment located at nearby on-shore facilities. This interference can be avoided by blocking transmission of the radar signal for a particular sector of rotation.

Examples of related radar systems which the Navy tests in-port include the AN/SPS-49 and the AN/SPS-40. Both the AN/SPS-49 and the AN/SPS-40 are two dimensional, air search radar systems which have an analog synchro voltage to indicate rotational bearing of the transmitting antenna. The AN/SPS-49, however, also has a sector-blanking system. The sector-blanking system includes a microprocessor of the radar system to generate a Radio Frequency (RF) gate to an RF amplifier of the SPS-49. This gate determines whether the RF amplifier will pass a signal for transmission by the antenna.

As with other radar systems, the signal transmitted by the AN/SPS-49 interferes with other electronic equipment during in-port testing. Adequate testing of the AN/SPS-49, however, may not require a full 360° of transmission by the rotating antenna. Thus, a technician may determine which particular rotational region or sector the sensitive electronic equipment is located and adjust the sector-blanking system. The system then blocks transmission of the rotating antenna of the AN/SPS-49 for the predetermined sector and thereby prevents interference with other electronic equipment.

The sector-blanking system of the AN/SPS-49 is incompatible for the related AN/SPS-40 because the sector-blanking system utilizes the microprocessor of the SPS-49. The same microprocessor also operates the entire radar system. Accordingly, the sector-blanking system is integrated as part of the AN/SPS-49 system and cannot be readily disconnected and attached to other radar systems.

Another related art is U.S. Pat. No. 2,959,737 by Simopoulos. Simopoulos discloses a periodic signal selector and blanking generator for aircraft which prevents unwanted signals of any external circuitry from interfering with an indicating system. The blanking generator system includes a steady periodic signal selector, a gated input amplifier, a regenerating multivibrator, two blanking multivibrators, and a cathode follower.

During operation, an incoming trigger signal feeds into the gated input amplifier and into the steady periodic signal selector. When blanking of particular equipment from the indicating system is desired, a video trigger pulse is fed to the two multivibrators, which in turn generate a blanking output pulse. This pulse prevents the gated amplifier from amplifying the trigger input signal for a period of 35 to 100 microseconds. The length of the blanking signal depends on the number of spurious echoes generated by interfering equipment rather than on the rotational bearing of the antenna. Also, the system focuses on preventing external electronic equipment from affecting the system instead of preventing the system from affecting external equipment.

SUMMARY OF THE INVENTION

Accordingly, an object of the present invention is to control transmission of a radar system which uses analog synchro voltages to indicate the position of the radar antenna.

Another object is to conduct in-port testing of radar systems without affecting sensitive electronic equipment located nearby.

A further object is to blank transmission of a radar system which uses analog synchro voltages to indicate the rotational positioning of the radar antenna with a device which is portable and easily connected.

The present invention attains the foregoing and additional objects by providing a radar sector blanker. The radar sector blanker is a portable system comprising an analog-to-digital (A/D) converter and a sector-blanking controller unit. The A/D converter connects to a position-indicating synchro unit of a radar antenna via a standard electrical cable. The A/D converter receives from the electrical cable five different analog voltages indicating the rotational bearing of the radar antenna and converts these voltages into binary-coded decimal (BCD) information. Another electrical cable inputs the BCD information to the sector controller unit.

The portable sector-blanking controller unit comprises a portable housing, a controller system, and a power supply. The portable housing has an enclosure and includes two thumb wheel switches mounted to a front panel of the enclosure. One of the thumb-wheel switches is an OFF switch which selects a rotational bearing at which radar transmissions will turn off. The other thumb-wheel switch is an ON switch which selects a rotational bearing at which radar transmissions will turn on. Two BNC jacks mount on the front panel. The jacks are for an input and an output of a modulator trigger for a radar transmitter. The enclosure has a left panel which includes a chassis for connecting to the electrical cable carrying the five different analog voltages of the synchro. The enclosure also has a rear panel with a 50-pin outlet for connecting to the A/D converter.

The controller system mounts to a removable circuit board and includes an OFF comparator circuit, an ON comparator circuit, an S-R latch, and a solid-state switch. Each comparator circuit comprises three cascaded 7485N four-bit, binary-coded decimal (BCD), magnitude comparator integrated chips using transistor-transistor logic (TTL). The OFF comparator circuit and the ON comparator circuit connect in parallel to each other and in series with the A/D converter and the S-R latch. The S-R latch comprises a 7402N TTL integrated circuit chip. The S-R latch operates as a flip-flop and connects in series to the solid state switch. The solid state switch is an integrated circuit chip, the AH0151CD, which requires ±15 Volts. The solid state switch connects in series to a modulator trigger which goes to a pulse modulator of a radar transmitter. The power supply connects to the solid-state switch, the TTL chips, and the thumb-wheel switches to give a direct-current voltage.

Still other objects and advantages of the present invention will become readily apparent to those skilled in the art from the following drawings and detailed description, wherein only the preferred embodiment of the invention is shown and described, simply by way of illustration of the best mode contemplated of carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

The numerous advantages of the present invention will be more fully appreciated from the detailed description when read with reference to the appended drawings wherein.

DETAILED DESCRIPTION OF THE INVENTION

Figure 1:
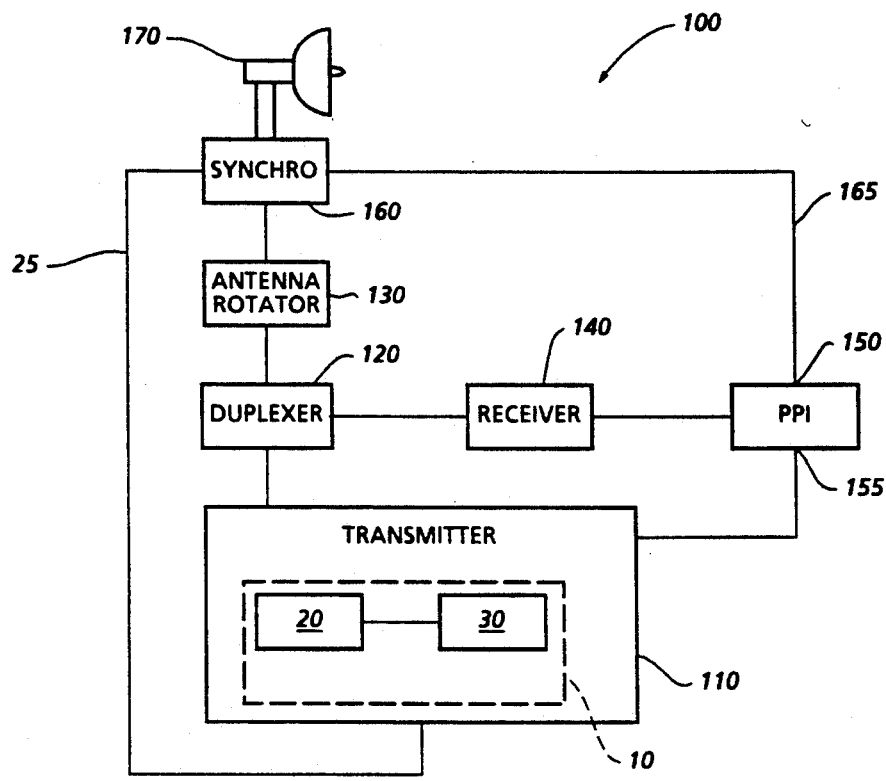
FIG. 1 is a simplified block diagram of a radar system.

Referring now to FIG. 1, a radar system 100 comprises a radar transmitter 110, a duplexer 120, an antenna rotator 130, a receiver 140, a plan position indicator (PPI) 150, a synchro 160, and an antenna 170. The transmitter 110 sends periodic pulses of high frequency energy through the duplexer 120 to the directional antenna 170, which is rotated at a constant speed by antenna rotator 130. The antenna then receives reflections of the high frequency energy from any reflective objects encountered by the energy during its path of travel. The reflections are sent through the duplexer 120 to the receiver 140 The PPI 150 displays a video output of the received signal. The transmitter 110 also sends synchronizing pulses to the PPI over connection 155 to coordinate the sweep of the PPI 150 with the radiated pulses of the transmitter. The synchro 160 supplies azimuth data over electrical connection 165 to coordinate the direction of the sweep of the PPI to that of the antenna 170.

The radar transmitter 110 includes a portable radar sector-blanking system 10. The sector-blanking system 10 comprises an analog-to-digital (A/D) converter 20 and a sector-blanking controller unit 30. The A/D converter 20 is a standard one commonly known in the art as the Model SR-102A manufactured by I.L.C. Data Device Corporation of Bohemia, N.Y. The A/D converter 20 at the sector-blanking controller unit 30 electrically connect to the position-indicating synchro unit 160 via connection 25 to obtain five analog voltages of the synchro. The five analog voltages are commonly known as S1, S2, S3, R1 and R2, with S1, S2 and S3 being sine wave signals which are 120° out-of-phase with one another. The five analog voltages enable determination of the rotational bearing of the antenna 170. The A/D converter 20 converts the five voltages into binary-coded decimal (BCD) information.

Figure 2:
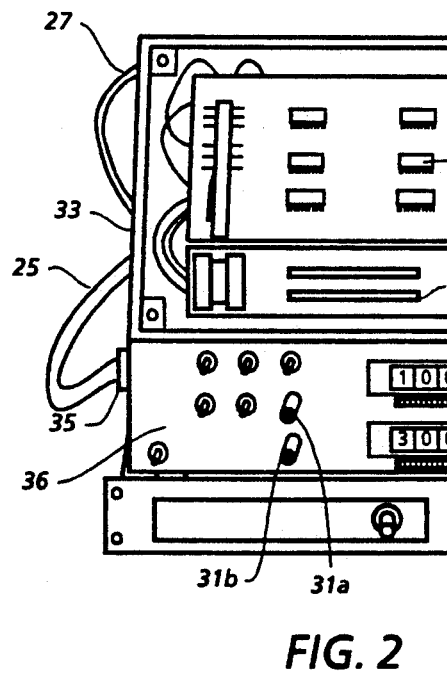
FIG. 2 is a perspective view of a sector-blanking system in accordance with the present invention.

FIG. 2 illustrates the A/D converter 20 and the portable sector-blanking controller unit 30. A multi-conductor cable 27 electrically connects the A/D converter 20 to the controller unit 30. The A/D converter 20 structurally connects to a portable housing 32. Electrical components 38 of the sector-blanking controller unit 30 are positioned within the portable housing 32. The portable housing 32 protects the electrical components and also facilitates transportation of the sector-blanking system from one radar system to another. The electrical components include two thumb wheel switches 34a and 34b mounted to a front panel 36 of the housing. The top thumb-wheel switch 34a is an OFF switch which selects a rotational bearing in degrees at which radar transmissions will turn off. The other thumb-wheel switch 34b is an ON switch which selects a rotational bearing again in degrees at which radar transmission will turn on.

The rotational bearing is any number between zero and 360 corresponding with the rotational bearing in degrees of the radar antenna. Rotational bearing may be either true or relative. Relative bearing is as follows: 0 degrees is the bow end of the ship (front), 90° is toward the starboard (right), 180° is toward the stern of the ship (rear), and 270° is toward the portside (left).

The portable housing 32 includes two BNC jacks 31a and 31b which mount on the front panel 36. The jacks are for an input and an output of a modulator trigger of the radar transmitter. The housing 32 also has a left panel 33 which includes a chassis 35 for connecting to an electrical cable 25 which carries the five different analog voltages of the synchro. The chassis 35 enables the cable 25 to be easily connected and disconnected. The controller unit 30 transfers the five synchro voltages to the A/D converter 20 first through a 50-pin connector (not shown) mounted on a rear panel of the housing 32 and then through the multi-conductor cable 27. The cable 27 also receives the corresponding BCD information generated by the converter and sent to the controller unit.

Figure 3:
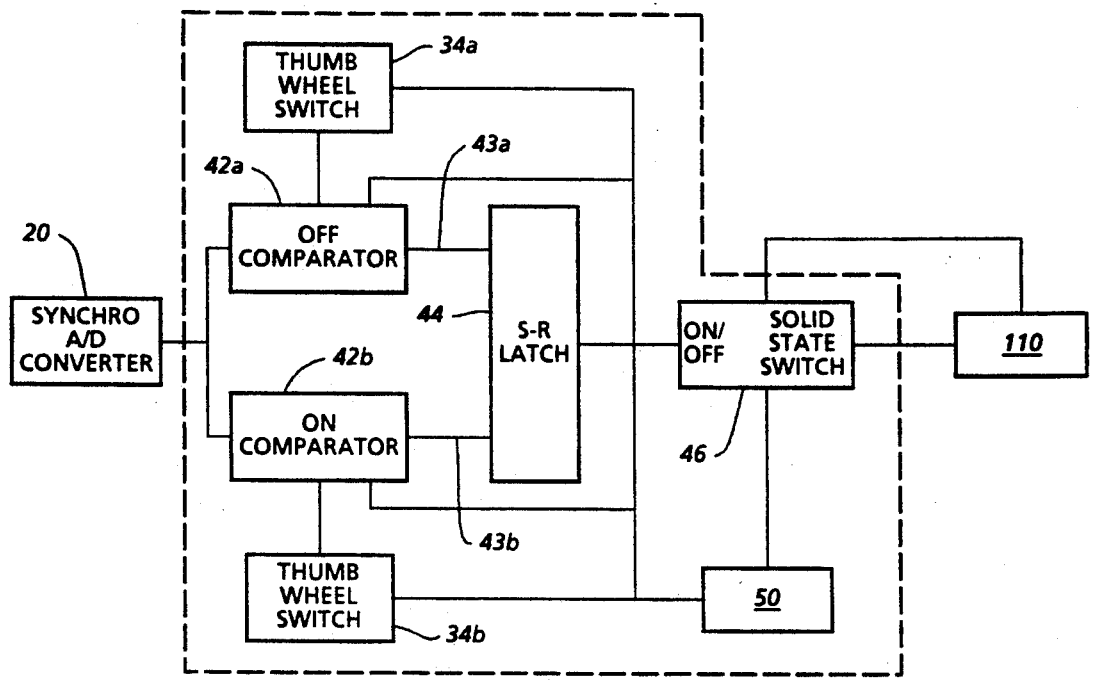
FIG. 3 is a simplified block diagram of a radar sector-blanking system in accordance with the present invention.

FIG. 3 illustrates a schematic block diagram of the electrical components 38 of the sector-blanking controller unit. The electrical components 38 include the thumb wheel switches 34a and 34b, a controller system, and a power supply 50. The controller system mounts to a removable circuit board and includes an OFF comparator circuit 42a, an ON comparator circuit 42b, an S-R latch 44, and a solid-state switch 46. The OFF comparator circuit 42a is electrically connected in series with the A/D converter 20. The ON comparator circuit 42b is also electrically connected in series with the converter 20 and in parallel with the OFF comparator circuit 42a. The OFF comparator circuit 42a is electrically connected to the OFF thumb-wheel switch 34a. The ON comparator circuit 42b is electrically connected to the ON thumb-wheel switch 34b. The S-R latch 44 is electrically connected in series with both the OFF comparator circuit 42a and the ON comparator circuit 42b. The solid-state switch 46 connects in series with the S-R latch and the radar transmitter 110.

Figures 4A, 4B:
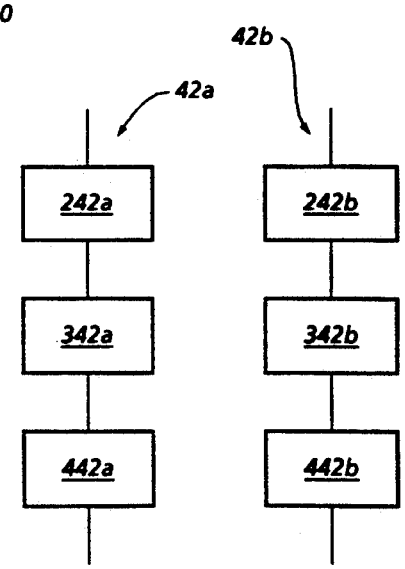
FIG. 4A is a simplified block diagram of an OFF comparator circuit in accordance with the present invention.
FIG. 4B is a simplified block diagram of an ON comparator circuit in accordance with the present invention.

As shown in FIG. 4A, the comparator circuit 42a comprises three 7485N four-bit, magnitude comparator integrated chips 242a, 342a and 442a connected in cascade. Likewise, as shown in FIG. 4B, the comparator circuit 42b comprises three 7485N four-bit, magnitude comparator integrated chips 242b, 342b and 442b connected in cascade. The chips 242a, 342a, 442a, 242b, 342b and 442b all use transistor-transistor logic.

Each TTL chip reads a rotational bearing digit inputted to the comparator circuit by the thumb-wheel switch. One TTL chip reads units (digits between 0 and 9), one for tens (inputs between 10 and 99), and the third for hundreds (inputs between 100 and 360). The chip then compares the input of the thumb-wheel switch with the BCD information of the converter describing the rotational bearing of the radar antenna. When a chip finds a match between the thumb-wheel input and the antenna bearing, the TTL chip outputs a match signal. Because the three chips are connected in cascade, however, the comparator circuit, as shown in FIG. 3, gives an output 43a or 43b to the S-R latch only when all three chips read a match. The outputs 43a and 43b of the comparator circuits correspond with the function of the circuit. When the OFF circuit reads a match, the output 43a sets the S-R latch which commands the solid-state switch to turn off. Conversely, when the ON circuit reads a match, the output 43b resets the S-R latch which commands the solid-state switch to turn on.

The S-R latch 44 reads and latches or stores the outputs 43a and 43b of the comparator circuits 42a and 42b, respectively. The S-R latch operates as a flip-flop and preferably comprises a 7402N integrated circuit chip which uses transistor-transistor logic. The S-R latch 44 has a set signal which is high and a reset signal which returns to the original signal. The set signal commands the solid state switch to turn off while the reset signal commands the switch to turn back on. The solid-state switch 46 is an integrated circuit chip such as the AH0151CD.

The power supply 50 connects to the solid-state switch 46, the thumb wheel switches 34a and 34b, and the comparator circuits 42a and 42b. The power supply 50 gives a direct-current voltage of +15 Volts and −15 Volts to the solid state switch 46. The supply 50 also gives a DC voltage of +5 Volts to the two thumb-wheel switches and to all three of the TTL chips located in each comparator circuit. The power supply mounts on a circuit board for easy removal and replacement.

Figure 5:
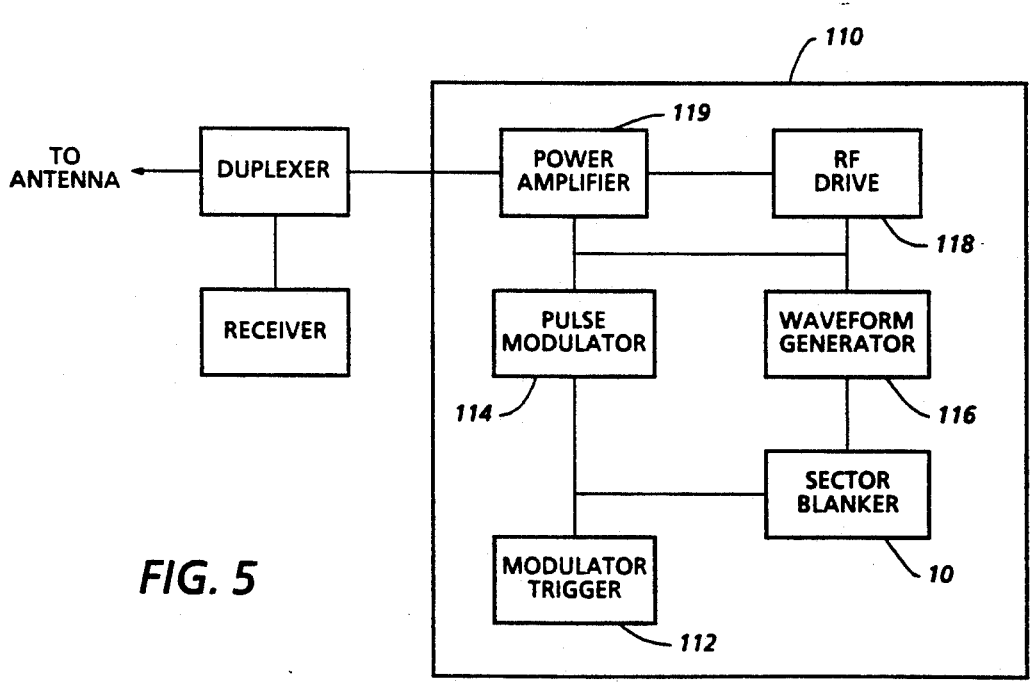
FIG. 5 is a simplified block diagram of a radar transmitter including a sector-blanking system in accordance with the present invention.

FIG. 5 represents a simplified block diagram of the radar transmitter 110. The radar transmitter 110 includes a modulator trigger 112, a pulse modulator 114, a waveform generator 116, an RF drive 118, and a power amplifier 119. Because the sector-blanking system 10 turns the transmission of the radar signal off and on, positioning of the switch for the system 10 within the transmitter 110 directly affects overall performance of the radar system. Preferably, the system 10 is connected between the modulator trigger 112 and the pulse modulator 114. The level of the voltage at this point within the transmitter 110 is much lower than at points after amplification such as after the modulator and after the RF drive. This location accordingly avoids any problems of voltage reflection typically encountered by switches at higher voltages Further, a switch located after the modulator trigger eliminates the problem of warm-up which would be encountered if the switch of system 10 is placed near the waveform generator.

The sector-blanking system enables in-port testing of a radar system. After a technician connects the portable sector-blanking system, he determines a particular sector or rotational region where transmission of the radar system would interfere with sensitive electronic equipment located nearby. The technician then sets the thumb wheel switches to the particular bearings where the transmission of the radar will be blanked. The sector-blanking system is then turned on and in-port testing may begin.

The unique features of this invention include a portable housing containing a sector-blanking controller unit, an A/D converter enabling use of analog synchro voltages, and two comparator circuits using TTL chips to compare the rotational bearings of the radar antenna to a predetermined value.

The advantages of the present invention include the ability to control transmission of a radar system which uses analog synchro voltages to indicate the position of the radar antenna. Other advantages include the ability to conduct inport testing of a radar system without affecting other sensitive electronic equipment located on-shore and the ability to transport, connect, and disconnect easily a sector-blanking system.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A system for blanking transmission of a radar system having an analog synchro voltage, comprising:
   a portable housing;
   means, connected to said portable housing, for converting the analog synchro voltage into binary-coded decimal information;
   first means, electrically connected in series to said means for converting and positioned within said portable housing, for comparing the binary-coded decimal information to a predetermined rotational positioning of a radar antenna;
   second means, electrically connected in series to said means for converting and in parallel to said first means for comparing, for comparing the binary-coded decimal information to a second predetermined rotational positioning of the radar antenna;

means, electrically connected in series to said first and second means for comparing, for latching outputs of said first and second means for comparing; and means, electrically connected to said means for latching and to the radar system, for switching off and on the transmission of the radar system.

2. A system for blanking transmission of a radar system having an analog synchro voltage as recited in claim 1 further comprising means, connected to said first and second means for comparing and to said means for switching, for supplying electrical power to the blanking system.

3. A system for blanking transmission of a radar system having an analog synchro voltage as recited in claim 1 further comprising an OFF switch, connected to a front panel of said portable housing, for selecting a rotational positioning where transmission of the radar system is turned off.

4. A system for blanking transmission of a radar system having an analog synchro voltage as recited in claim 1 further comprising an ON switch, connected to a front panel of said portable housing, for selecting a rotational positioning where transmission of the radar system is turned on.

5. A system for blanking transmission of a radar system having an analog synchro voltage as recited in claim 1 wherein said first means for comparing comprises three 7485N four-bit, magnitude comparator integrated chips connected in cascade, each chip using transistor-transistor logic.

6. A system for blanking transmission of a radar system having an analog synchro voltage as recited in claim 1 wherein said second means for comparing comprises three 7485N four-bit, magnitude comparator integrated chips connected in cascade, each chip using transistor-transistor logic.

7. A system for blanking transmission of a radar system having an analog synchro voltage as recited in claim 1 wherein said means for latching comprises a 7402N transistor-transistor logic integrated circuit chip.

8. A system for blanking transmission of a radar system having an analog synchro voltage as recited in claim 1 wherein said means for switching comprises an AH0151CD integrated circuit chip.

9. A radar system comprising:

a radar transmitter having a sector-blanking system, said sector blanking system comprising a portable housing, means, connected to said portable housing, for converting the analog synchro voltage into binary-coded decimal information, first means, electrically connected in series to said means for converting and positioned within said portable housing, for comparing the binary-coded decimal information to a predetermined rotational positioning of a radar antenna, second means, electrically connected in series to said means for converting and in parallel to said first means for comparing, for comparing the binary-coded decimal information to a second predetermined rotational positioning of the radar antenna, means, electrically connected in series to said first and second means for comparing, for latching outputs of said first and second means for comparing, and means, electrically connected to said means for latching and to the radar system, for switching off and on the transmission of the radar system;

a duplexer, electrically connected to said radar transmitter;

an antenna, electrically connected to said duplexer, for transmitting pulses of high frequency energy and detecting energy reflections;

means, connected to said antenna, for rotating said antenna about a horizontal axis;

means, electrically connected to said duplexer, for receiving the detected energy reflections from said antenna;

means, electrically connected to said means for receiving, for displaying a video output of the received energy signal; and a synchro, electrically connected to said antenna, said means for rotating, and said means for displaying, for coordinating the sweep of said means for displaying with the sweep of said antenna.

* * * * *